US008156328B1

(12) United States Patent
Kowalski et al.

(10) Patent No.: US 8,156,328 B1
(45) Date of Patent: Apr. 10, 2012

(54) ENCRYPTION METHOD AND DEVICE

(75) Inventors: Bernd Kowalski, Siegen (DE);
Klaus-Dieter Wolfenstetter,
Zwingenberg-Rodau (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/403,689

(22) PCT Filed: Mar. 11, 1998

(86) PCT No.: PCT/EP98/01391
§ 371 (c)(1),
(2), (4) Date: Oct. 22, 1999

(87) PCT Pub. No.: WO98/48540
PCT Pub. Date: Oct. 29, 1998

(30) Foreign Application Priority Data

Apr. 22, 1997 (DE) .................................. 197 16 861

(51) Int. Cl.
*H04L 29/06* (2006.01)
(52) U.S. Cl. ........................................ 713/165; 713/171
(58) Field of Classification Search .................. 380/285, 380/282, 277, 262, 259; 713/171, 165
See application file for complete search history.

(56) References Cited

U.S. PATENT DOCUMENTS

| 4,786,790 | A | | 11/1988 | Kruse et al. | |
| 4,974,193 | A | | 11/1990 | Beutelspacher et al. | |
| 5,142,578 | A | * | 8/1992 | Matyas et al. | 380/280 |
| 5,425,103 | A | * | 6/1995 | Shaw | 380/44 |
| 5,513,261 | A | | 4/1996 | Maher | |

(Continued)

FOREIGN PATENT DOCUMENTS

DE  27 06 421  6/1978

(Continued)

OTHER PUBLICATIONS

Handbook of Applied Cryptography, 1997, Menezes, p. 21.*

(Continued)

*Primary Examiner* — Christopher Brown
(74) *Attorney, Agent, or Firm* — Kenyon & Kenyon LLP

(57) ABSTRACT

A method and a device are disclosed for the low-cost implementation even of high-performance encryption functions in an encryptor. The encryptor may be composed merely of PC software or the like, or of any other terminal/information system with integrated Vernam cipher which does not need to be supported by expensive crypto-hardware for the actual encryption process. The crypto-hardware is made either of a chipcard or a multifunctional PC interface adapter (e.g., PCMCIA module) with built-in special crypto-hardware. The encryptor, on the other hand, is a conventional personal computer, software or another terminal which, however, with the exception of the very simple Vernam cipher (e.g., EXOR), needs no further crypto-technology even for broad-band applications in software. The external crypto-modules contain all the complex crypto-functions which generate the Vernam key in reserve, the reserves being temporarily stored in an intermediate storage until they are gradually used up by the encryption process through logic operations of the method. The storage may be installed either in the PC or terminal, or also in the crypto-module. The encryptor always operates with the same Vernam cipher, even if the external crypto- or PCMCIA modules use different symmetrical and asymmetrical ciphers. External crypto-modules in the form of chipcards or PCMCIA modules are inexpensive to manufacture. All the complex crypto-functions are located outside of the encryptor. They are interchangeable by module and can be implemented in the proposed low-cost and somewhat lower-speed external crypto-modules.

16 Claims, 5 Drawing Sheets

U.S. PATENT DOCUMENTS

| | | | | |
|---|---|---|---|---|
| 5,805,204 | A | * | 9/1998 | Thompson et al. ............. 725/48 |
| 6,169,805 | B1 | * | 1/2001 | Dunn et al. ................... 380/277 |
| 6,285,991 | B1 | * | 9/2001 | Powar ............................ 705/76 |

FOREIGN PATENT DOCUMENTS

EP    0 616 429    9/1994

OTHER PUBLICATIONS

Fey, "Verschluesselung von Sprache und Daten," Bd. 40, Nr. 10, Jan. 1, 1990, pp. 376-377.

Beutelspacher, "Kryptologie", Vieweg Verlag, 1993.

R. L. Rivest et al., "A Method for Obtaining Digital Signatures and Public-Key Cryptosystems", Communications of the ACM, Feb. 1978, vol, 21, No. 2 pp. 120-126.

CACM Communications of the ACM, vol. 21, No. 2, pp. 120-126, 1978.

Information technology—Security techniques—Procedures for the registration of cryptographic algorithms, ISO/IEC 9979: 1999(E).

* cited by examiner

ENCRYPTION METHOD AND DEVICE

FIELD OF THE INVENTION

The present invention relates to a method for encryption and to a device for implementing the method.

BACKGROUND INFORMATION

Modern encryption methods are being increasingly employed in information processing and telecommunication engineering. However, the use of encryption methods and corresponding devices is persistently impeded by the below-described problems and factors, although mass proliferation, particularly in the multimedia sector and in the field of information processing, calls for a very high standard of security:

The encryption of broad-band signals requires the installation of costly crypto-hardware in personal computers and terminals. The currently available low-cost crypto-chipcards operate only at a low throughput rate of significantly less than 100 kbit/s.

Encryption methods are often protected by property rights and not internationally standardized, so that no low-cost mass products with integrated crypto-hardware are available.

For reasons of cost, crypto-hardware for broad-band encryption frequently employs just one encryption method. Consequently, the personal computers and other terminals equipped with one of these methods are not able to support any number of encryption methods. This results in a great restriction in the compatibility of the indicated devices.

Crypto-hardware is subject to strict international trade restrictions, with the result that the export, for example, of encryption terminals is very greatly restricted, which is why the use of such devices is very greatly limited and the prices for these devices are very high.

The book by Alfred Beutelspacher: "Kryptologie", Vieweg Verlag, 1993, describes and presents encryption methods such as the Vernam cipher. In addition, encryption methods such as the RSA method are described in ITU/CCITT Recommendations X.509 and in CACM Communications of the ACM, Vol. 21, No. 2. pp. 120-126, 1978.

SUMMARY OF THE INVENTION

An object of the present invention is to create a method and a device for encryption, an aim being to realize simplified implementation while avoiding expensive and incompatible broad-band encryption hardware, so that in the future, low-cost mass products can be equipped with integrated crypto-hardware, this considerably improving the standard of security of such products.

An advantage of the design approach according to the present invention is that the encryptors may operate with the same Vernam cipher (e.g., EXOR). They can be used without problem even when the external crypto- or PCMCIA modules (e.g., a multifunctional PC interface adapter) employ different symmetrical and asymmetrical ciphers. The Vernam cipher can also be implemented in software for high throughput rates, so that all encryptors are able to get along without the need for expensive crypto-hardware and can be used cost-effectively in mass products because their manufacture is technologically simple. The external crypto-modules likewise remain competitively priced because the Vernam key, produced in reserve, can also be generated by a low-performance or low-speed chipcard, for example, for reserve in the Vernam-key storage, without slowing down the actual broad-band encryption process operating independently thereof.

Because of the method described herein, the encryptors are freed from the problems of expensive, high-performance and mutually incompatible crypto-hardware. By contrast, the Vernam cipher can be implemented very simply and cost-effectively in software, and consequently by storage. Complex crypto-functions are located outside of the encryptor. They are interchangeable by module and can be implemented in the competitively priced and low-speed external crypto-modules, such as the chipcard or the PCMCIA card, for example. The methods used are negotiated or "signaled" during coordination between sender and receiver, for example, on the transmission path. The encryptor itself may be composed merely of software, such as, for example, PC software, or any other terminal/information system with an integrated Vernam cipher which does not need to be supported by expensive crypto-hardware for the actual encryption process.

DETAILED DESCRIPTION

Figure 1:
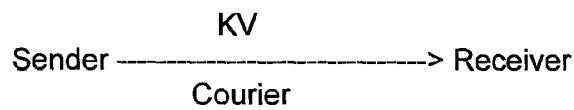
FIG. 1 illustrates a Vernam cipher according to the present invention.
Figure 1:
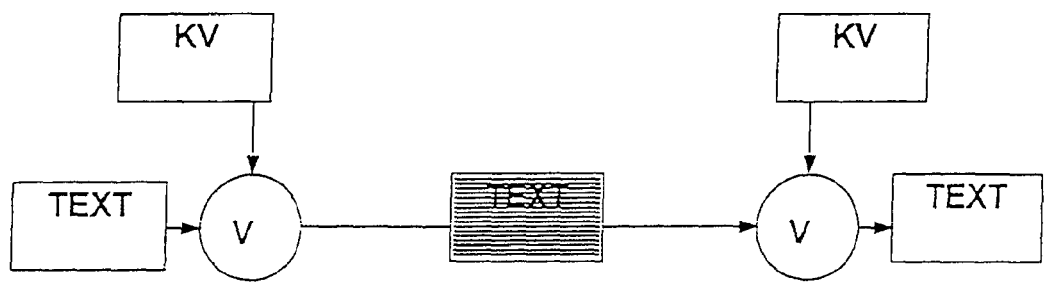
Figure 2:
FIG. 2 illustrates a symmetrical cipher according to the present invention.
Figure 2:
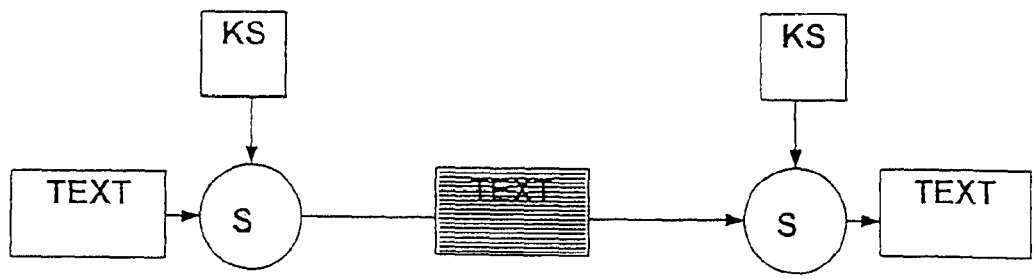
Figure 3:
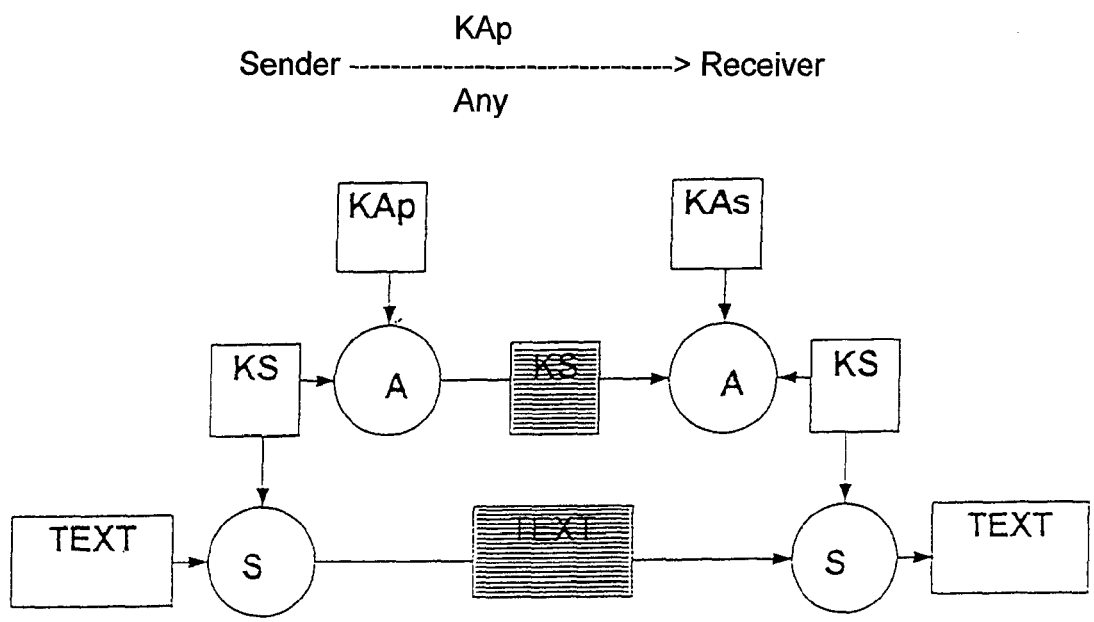
FIG. 3 illustrates a first embodiment according to the present invention using an asymmetrical cipher.
Figure 4:
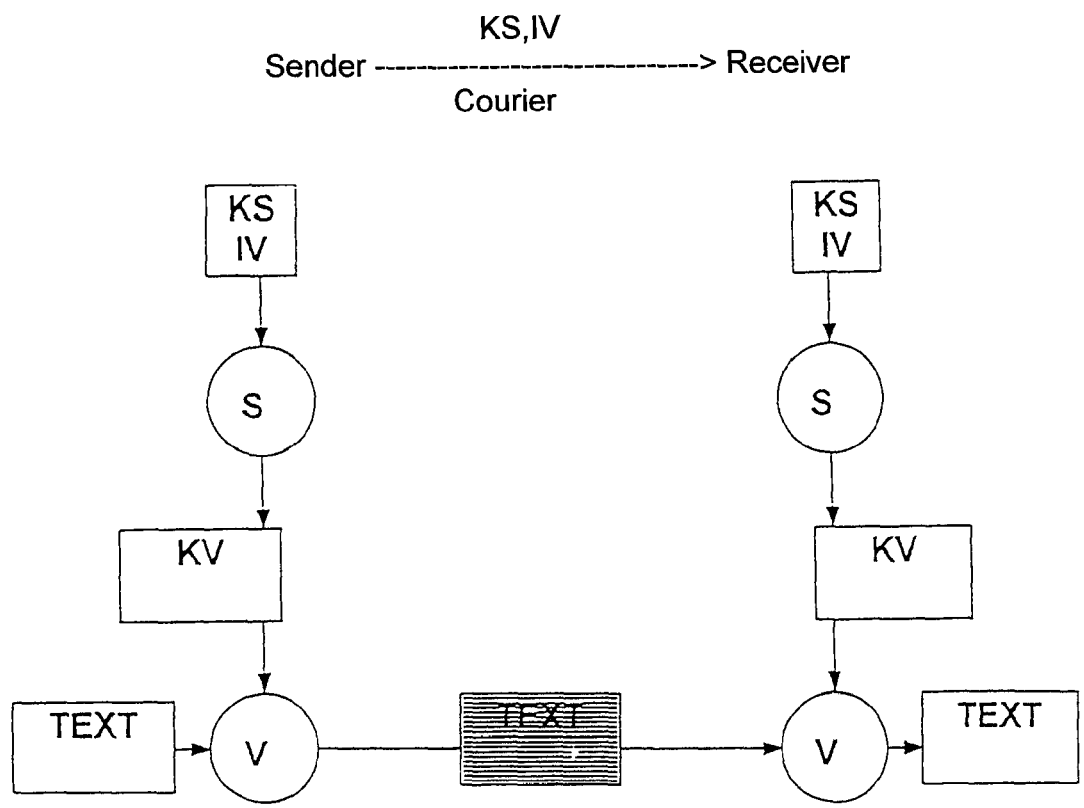
FIG. 4 illustrates an second embodiment according to the present invention using a Vernam cipher.
Figure 5:
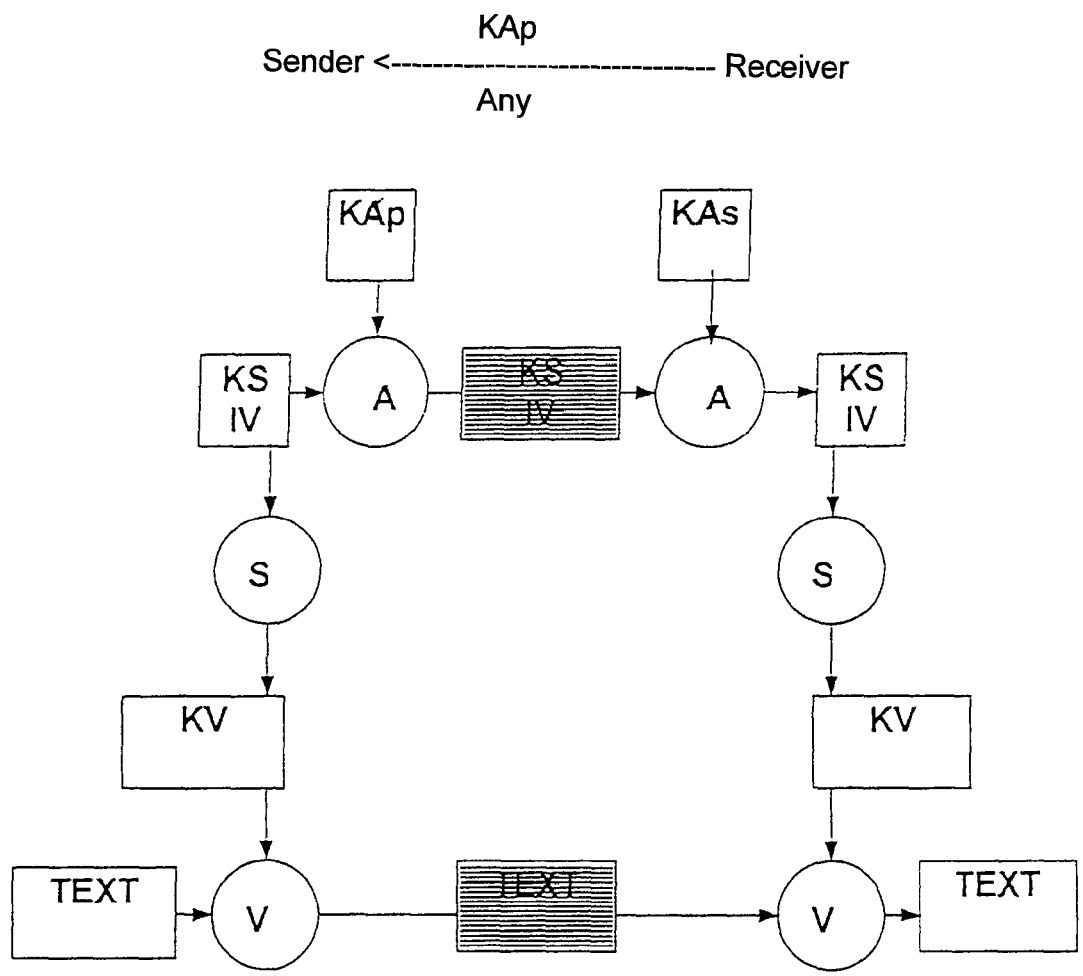
FIG. 5 illustrates a third embodiment according to the present invention using a Vernam cipher.

FIG. 1 shows a Vernam cipher in simplified form. The encryption process, identified here by "V", may be a very simple mathematical operation, such as, for example, EXOR, which also allows broad-band encryption in software, i.e., without the support of a special crypto-hardware. A disadvantage, however, is that the message, indicated by "TEXT", must be encrypted using a Vernam key KV including of a random number having the length of the message to be encrypted. Consequently, long Vernam keys are required for long messages. This means that the Vernam cipher can only be used to a limited extent for practical applications. FIG. 2 shows a modern symmetrical cipher S, such as, for example, DES or IDEA, which also still provides excellent security in the case of relatively short key lengths, typically 128 bits for the secret symmetrical key KS. DES and IDEA, respectively, are data encryption standards (ANSI and ASCOM) ISO 9979. Here too, however, as in the case of the Vernam cipher, the secret key KS required for encryption and decryption must be exchanged via a secure channel, independent of the transmission path used for the message, for example, with the aid of a courier. The configuration shown in FIG. 3, which is described in detail in the literature source indicated in the introduction, has avoided this disadvantage through the additional use of an asymmetrical cipher A, for example, the RSA method, for the transmission of the secret encryption key KS. In this case, the encryption key KS is encrypted with the public asymmetrical key KAp of the recipient and can subsequently be decrypted again by the recipient using his secret symmetrical key. The public recipient key KAp used for this purpose at the sender's end can be transmitted to him by the recipient over any insecure channel. Of course, the message could also be encrypted directly with the public recipient key KAp, but the achievable performance of the hardware and software available for an asymmetrical cipher is significantly lower than in the case of a symmetrical cipher, so that in the case of long messages and to attain a high processing speed, use is made of the asymmetrical and symmetrical ciphers, usually in the combination shown in FIG. 3, namely a hybrid method. In FIG. 4, the encryption of a secret parameter IV of variable length, for example, n·180 bits, with a symmetrical key KS, for example, 128 bits, results in the generation of a very long (pseudo)-random number which, as Vernam key KV, finally encrypts the message to be protected. For transmission of the encryption/decryption key to the recipient, however, the courier in this case does not need to transport the Vernam key KV, but merely the key KS and the parameter IV, from which the Vernam key KV can easily be simulated on the recipient's side, because the same configuration exists here as on the sender's side. FIG. 5 shows encryption using combined asymmetrical, symmetrical and Vernam ciphers, as in FIG. 4. In contrast to FIG. 4, which requires a courier for exchanging the secret key information, according to FIG. 5 an asymmetrical cipher is used for this purpose, analogous to FIG. 3. The public recipient key KAp is fed in on the sender's side and the asymmetrical sender key KAs on the recipient's side.

Figure 6:
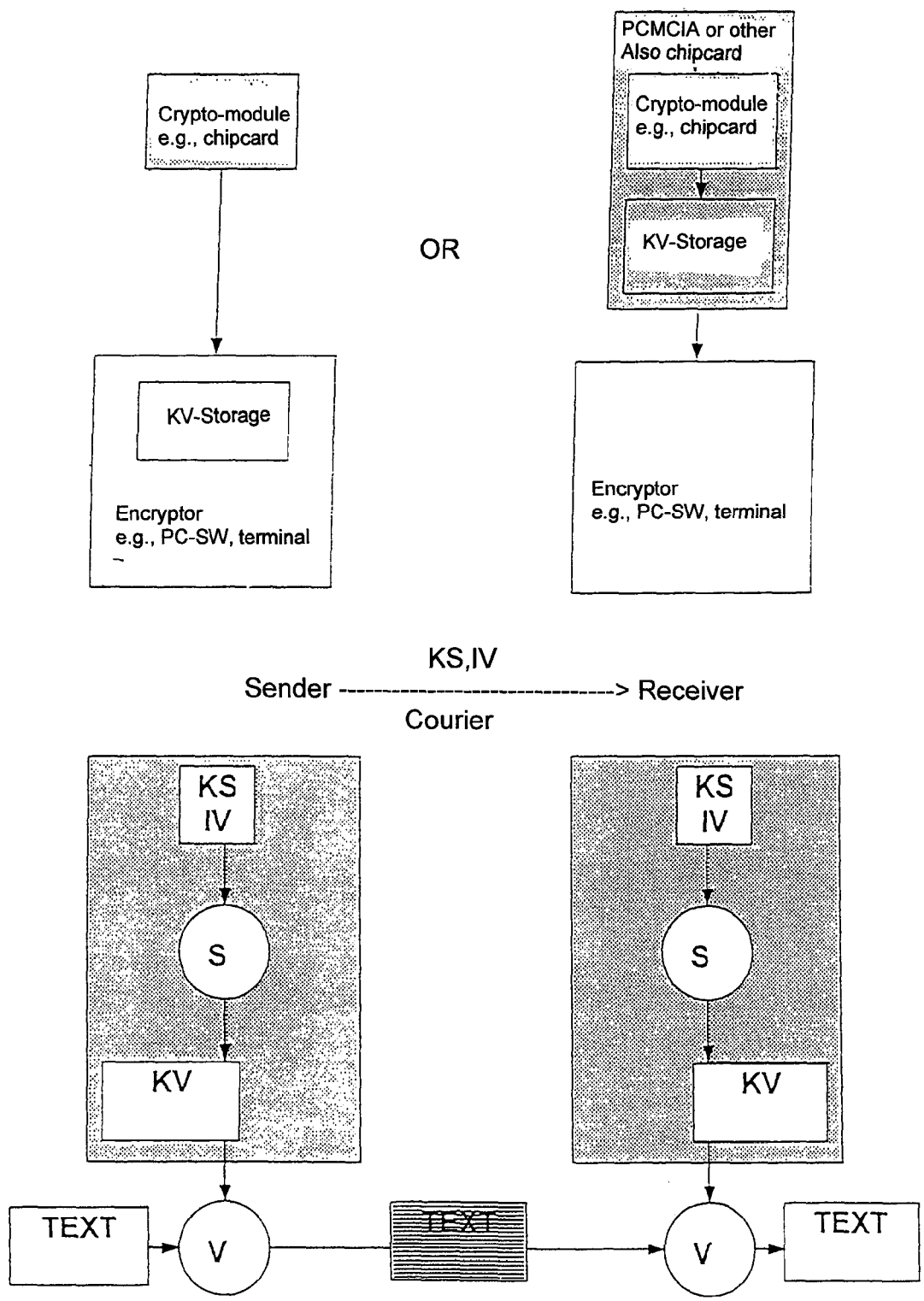
FIG. 6 illustrates a fourth embodiment according to the present invention using a crypto-module.
Figure 7:
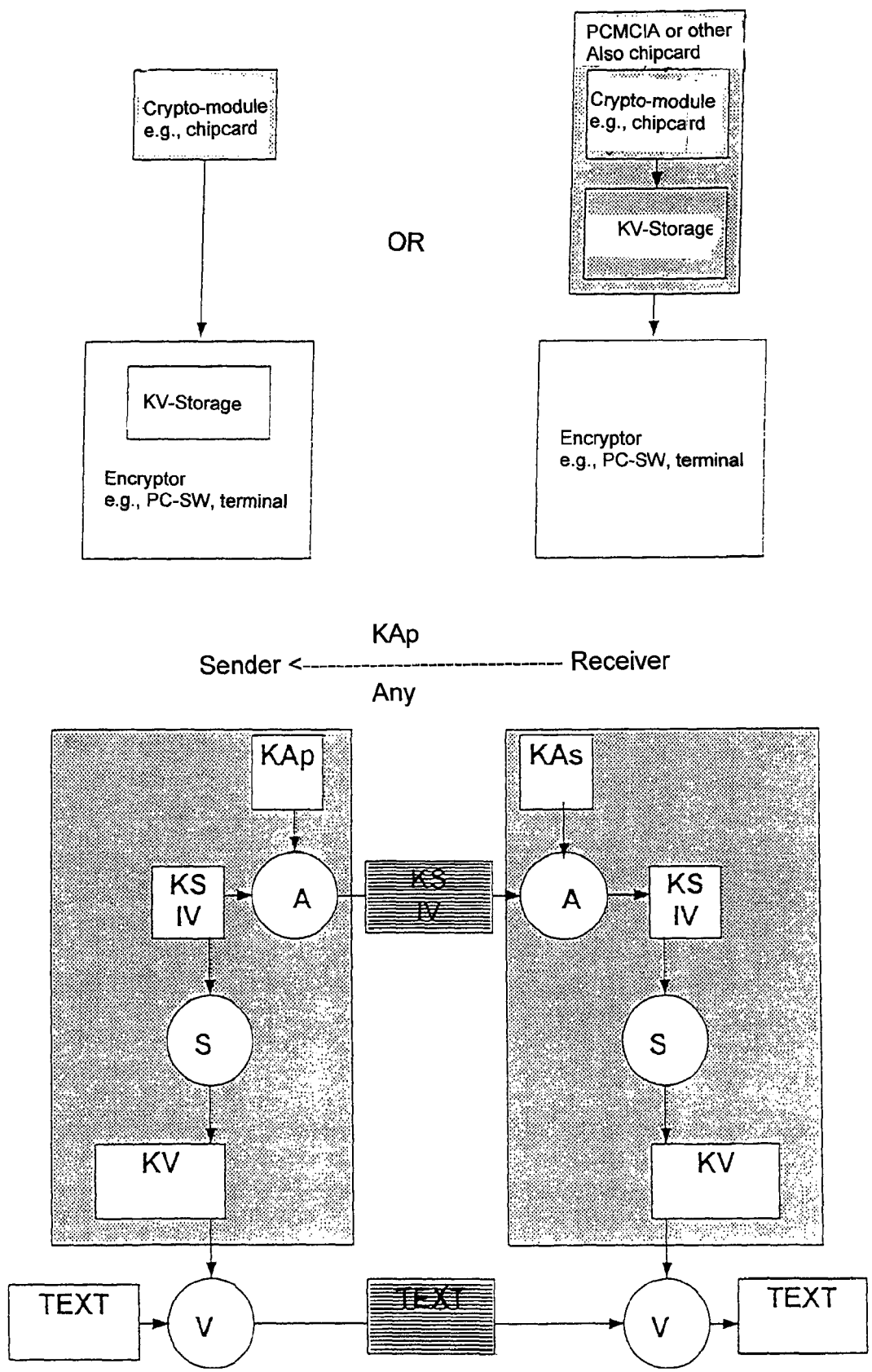
FIG. 7 illustrates a fifth embodiment according to the present invention using the crypto-module.

An advantage of this procedure is made apparent in FIG. 6 and FIG. 7. The upper halves of FIG. 6 and FIG. 7, therefore, each show two terminal configurations. The gray-shaded elements represent the external crypto-hardware, including, for example, either or a chipcard or of a multifunctional PC interface adapter or PCMCIA module with built-in special crypto-hardware or a built-in special chipcard. The encryptor, on the other hand, is implemented as a conventional PC, with software or another terminal which, however, with the exception of the very simple Vernam cipher, such as, for example, EXOR, that can be implemented even for broad-band applications in software, requires no further crypto-technology. FIG. 6 and FIG. 7 both show that the external crypto-modules are capable of taking on all the complex crypto-functions, generating the Vernam key KV, so to speak, as reserves and storing them in a suitable intermediate storage, the KV storage, until they are gradually used up by the encryption process through the logic operations V. The KV storage may be installed either in the personal computer or terminal, or also in the crypto-module in the form of a chipcard or PCMCIA module. An advantage of the devices according to FIG. 6 and FIG. 7 is that the encryptor is always able to operate with the same Vernam cipher, even if the external crypto- or PCMCIA modules use different symmetrical and asymmetrical ciphers. The Vernam cipher can also be implemented in software for high throughput rates, so that all encryptors are able to get along without expensive crypto-hardware and can be mass-produced at low cost. The external crypto-modules likewise remain competitively priced because the Vernam key, produced in reserve, can also be generated by a low-performance, i.e., low-speed chipcard, for example, for reserve in the KV storage, without slowing down the actual broad-band encryption process which operates independently thereof.

Because of the method described herein, the encryptors are freed from the problems of expensive, high-performance and mutually incompatible crypto-hardware. On the other hand, the Vernam cipher can be implemented very simply and inexpensively in software. All the complex crypto-functions are located outside of the encryptor. The great advantage is also that they are interchangeable by module and can be implemented in the competitively priced and low-speed external crypto-modules, such as, for example, a chipcard or a PCMCIA card. The methods used are negotiated or signaled during coordination between sender and receiver, for example, on the transmission path.

The method for the low-cost implementation even of high-performance encryption functions in an encryptor which may be composed merely of PC software or any other terminal/information system with integrated Vernam cipher that does not need to be supported by expensive crypto-hardware for the actual encryption process has the distinction that, with the aid of a secret key KS having a defined key length and using a variable parameter having a defined bit length, a Vernam key KV having the length of the message to be encrypted is generated by way of any symmetrical cipher S, the Vernam key KV, on its part, encrypting the message to be protected by way of the Vernam cipher, the secret key KS and the parameter IV being communicated from the sender to the recipient either via a secure channel separate from the message-transmission path, or directly on the message-transmission path, for example, secured by an asymmetrical method A, the recipient regenerating the Vernam key KV using the above-described method in order to be able therewith to decrypt the received message. The symmetrical and, optionally, also the asymmetrical cipher and, optionally, also the storage for the Vernam key, namely the KV storage, are accommodated in an external crypto-module separate from the encryptor, for example, in the form of a chipcard or PCMCIA module or the like, while only the Vernam cipher and, optionally, the storage KV for the Vernam key remain in the encryptor.

List of reference characters

| | |
|---|---|
| KV | Vernam key |
| V | Logic operation, such as EXOR |
| KS | Secret symmetrical key |
| S | Symmetrical cipher, such as IDEA |
| KAp | Recipient key (asymmetrical) |
| KAs | Sender key (asymmetrical) |
| A | Asymmetrical cipher |
| IV | Secret variable parameter |
| PCMCIA | Multifunctional PC interface adapter |
| PC-SW | PC software |

What is claimed is:

1. An encryption system, comprising:
generating a Vernam key via a symmetrical cipher by a hardware processor, the generating being aided by using a secret key and a variable parameter, the Vernam key having a length that is equal to a length of a message to be protected, the secret key having a defined key length, the variable parameter being a function of a random number and the defined key length;
encrypting by an encryptor, via a Vernam key, the message using logic operations of a Vernam cipher;
communicating, from a sending point to a receiving point, the secret key and the variable parameter via a secure channel separate from a message-transmission path;
regenerating the Vernam key using the transmitted secret key and variable parameter;
decrypting the message using the regenerated Vernam key;
providing crypto-hardware including at least one of a chipcard and a multifunctional PC interface adapter with built-in special crypto-hardware, the crypto-hardware storing at least one generated Vernam key;
utilizing the at least one generated Vernam key stored in the crypto-hardware by the encryptor; and wherein the encryptor being capable of coupling to the crypto-hardware, the encryptor includes at least one of a personal computer, software executable by a computer, and a terminal which implements a Vernam cipher for broad-band applications in software.

2. The encryption system according to claim 1, wherein the crypto-hardware is designed as an external crypto-module and wherein the crypto-hardware has an intermediate storage, the intermediate storage storing a reserve of the Vernam key.

3. The encryption system according to claim 2, wherein the intermediate storage is disposed in one of the personal computer and the terminal.

4. An encryption system, comprising:
a secret key having a defined key length;
a variable parameter having a length being a function of a random number and the defined key length;
a symmetrical cipher;
a Vernam key having a length that is equal to a length of a message to be protected; the Vernam key being generated from the symmetrical cipher encryption of the secret key and the variable parameter, the Vernam key encrypting the message using logic operations from a Vernam cipher;
at least one of a message-transmission path and a secure channel, the message-transmission path being a path over which the encrypted message is communicated, the secure channel being secured by encrypting the secret key and the variable parameter with an asymmetrical cipher, the encrypted secret key and the variable parameter being communicated over the secure channel, the secure channel being separate from the message-transmission path; and
a crypto-module including a storage space and one of the symmetrical cipher and the asymmetrical cipher, wherein the crypto-module is separate from the encryptor, the storage space is used to store the Vernam key, and any Vernam cipher operations are performed in the encryptor,
wherein the secret key and the variable parameter are communicated over the secure channel and, subsequently, used in regenerating the Vernam key, the regenerated Vernam key decrypting the message; and wherein the encryptor communicates with the crypto-module to utilize the Vernam key.

5. The encryption method according to claim 4, wherein the communicating, from a sending point to a receiving point, the secret key and the variable parameter occurs via the message-transmission path, the message-transmission path being secured via an asymmetrical cipher.

6. A method for implementing an encryption system, comprising:
generating a Vernam key from a secret symmetrical key and a secret variable parameter, the secret key having a secret key bit length and the secret variable parameter being a random number multiplied by the secret key bit length, the generated Vernam key having a Vernam key length which is one of equal to and exceeds a message bit length of a message to be encrypted and transmitted;
encrypting via an encryptor using the Vernam key the message using logic operations of a Vernam cipher;
communicating, from a sending point to a receiving point, the secret key and the variable parameter via a secure channel separate from a message transmission path;
regenerating the Vernam key at the receiving point using the transmitted secret key and variable parameter;
decrypting the transmitted message using the regenerated Vernam key communicated to the receiving point;
wherein a plurality of Vernam keys are generated and stored in a storage module, one of a symmetrical cipher and an asymmetrical cipher is installed and stored in the storage module, the storage-module being separate from an encryptor, and wherein encryption operations using the Vernam cipher are performed in the encryptor, the encryptor including a computer, the encryptor communicating with the crypto-hardware in order to utilize the at least one generated Vernam key stored in the crypto-hardware.

7. The method according to claim 6, wherein the Vernam key is generated from a symmetrical cipher operated on the secret key and the variable parameter.

8. The method according to claim 6, wherein the secret key is a symmetrical key.

9. The method according to claim 6, wherein the Vernam cipher is a simple mathematical operation.

10. The method according to claim 9, wherein the simple mathematical operation is EXOR.

11. The method according to claim 6, wherein the encryptor is a processor.

12. The method according to claim 6, wherein the storage module is at least one of a low-speed chipcard, a chipcard, a PCMCIA module, memory in a personal computer, and memory in a terminal.

13. The method according to claim 6, wherein the Vernam cipher operations are performed exclusively in the encryptor.

14. The method according to claim 6, wherein the storage module is an external crypto-module; and further comprising controlling, via the Vernam cipher, encryption operations in the encryptor.

15. The method according to claim 6, wherein the Vernam key is stored in the encryptor.

16. The method according to claim 6, wherein for each Vernam cipher operations on message transmission, one of the generated Vernam keys is used, each Vernam key being used only during one message transmission event.

* * * * *